Patented Apr. 22, 1947

2,419,335

UNITED STATES PATENT OFFICE 2,419,335

PURIFICATION OF BUTADIENE BY EXTRACTIVE DISTILLATION WITH NITROPARAFFIN SOLVENTS

David Craig, Silver Lake, Ohio, assignor to The B. F. Goodrich Company, New York, N. Y., a corporation of New York No Drawing. Application May 2, 1942, Serial No. 441,543

4 Claims. (Cl. 202—39.5)

1

This invention relates to the concentration and purification of butadiene-1,3, hereinafter referred to as butadiene, and it pertains more particularly to an improved method of separating butadiene from other four-carbon hydrocarbons of about the same boiling point such as butane and the several butenes or butylenes.

It is well known that butadiene is formed along with other hydrocarbons in the cracking of petroleum. With suitable regulation of the cracking conditions it is possible to convert a considerable proportion of the petroleum into butadiene. The butadiene which is so produced, however, is accompanied by other lower hydrocarbons which frequently preponderate greatly over the butadiene. The usual fractionation of the liquefied refinery gases obtained from the cracking process is capable of separating butadiene quite sharply from accompanying hydrocarbons containing fewer carbon atoms such as methane, ethane, ethylene, propane and propylene, as well as from those containing more carbon atoms, such as the pentanes, amylenes, etc., but is incapable of bringing about an effective separation of butadiene from other four-carbon hydrocarbons such as butane and butylenes. In the preparation of pure butadiene from cracked petroleum, therefore, the four-carbon hydrocarbons may be isolated as a group by fractional distillation, but, because of the close similarity in their boiling points, recourse to some other procedure is essential for the isolation of the butadiene itself.

It has already been proposed to separate butadiene from other four-carbon hydrocarbons by distilling the hydrocarbon mixture through a fractionating column down which flows a suitable solvent, the butadiene being taken up by the solvent and the other hydrocarbons being discharged at the top of the column. Previous workers have made a number of different suggestions as to suitable solvents to be used for this kind of process. One suggestion has been that the solvent should be one which forms separate liquid layers when shaken with a liquid mixture of butadiene and butylene. Another suggestion has been that the solvent should have a high dielectric constant. Another suggestion has been that the solvent should be miscible with both water and benzene.

2

I have discovered that none of the properties suggested by previous workers and enumerated above have any true relationship to selectivity of solvents and their consequent utility in the separation of butadiene from butylenes and butane, but that a class of materials which does not conform at all to these supposed requirements is of great value for this purpose. This class of materials consists of liquid nitro derivatives of the paraffin hydrocarbons or, as they are commonly called, the nitroparaffins. Examples of suitable liquid nitroparaffins are nitromethane, nitroethane, 1-nitropropane, 2-nitropropane, 1-nitrobutane, 2-nitrobutane, 1-nitropentane, 3-nitropentane, 1-nitrohexane, 4-nitroheptane, 1-nitro-octane, 2-methyl-3-nitrobutane, 2-methyl-1-nitropropane, 1,1-dinitroethane, 1,1-dinitrobutane, 1,2-dinitrobutane, 2-methyl-2,3-dinitrobutane and the like or mixtures of these such as the crude nitration products of a mixture of paraffin hydrocarbons. The preferred nitroparaffins for use as selective solvents are those which have the structure R—NO$_2$ where R is an alkyl radical containing less than six carbon atoms.

The nitroparaffins plainly do not conform to the supposed requirements for selective solvents for butadiene stated by previous workers. They are generally completely miscible under ordinary conditions with liquid butadiene or butylene or mixtures thereof, and therefore incapable of forming two liquid layers. Their dielectric constants are not particularly high, they are not miscible with water and in fact are not even soluble in water to any appreciable extent. Moreover, it is highly surprising that the nitroparaffins should exert a selective solvent action for butadiene, a diolefin, in preference to butane, a paraffin, in view of the fact that they are more closely related structurally to the paraffins and might be expected to dissolve paraffins in preference to other types of hydrocarbons in the same manner that nitro-olefins are known to dissolve olefins in preference to other types of hydrocarbons. Nevertheless, the nitroparaffins are excellent selective solvents for butadiene and can be used to bring about any desired degree of separation from butylene and butane.

In the practice of this invention, crude butadiene, containing butanes and butylenes but no appreciable proportions of other materials is separated into fractions containing any desired proportions of butadiene by extracting the crude butadiene, in the vapor state, with a liquid nitroparaffin and then separating the dissolved butadiene from the nitroparaffin by distillation. A considerable enrichment of butadiene may be effected merely by passing the vapors of the hydrocarbon mixture up a scrubbing tower down which the liquid nitroparaffin is allowed to flow or by any other simple method of bringing the impure butadiene vapors into contact with the solvent, but, for more quantitative separations of butadiene from butylenes and butane it is necessary to pass the vapor of the crude butadiene through an efficient fractionating column down which the solvent is allowed to flow. In this latter process it is preferred to maintain the rate of flow of the solvent down the fractionating column, compared to the rate of removal of impurities, above a certain critical ratio, as is pointed out in detail in the copending application of Waldo L. Semon and David Craig, Serial No. 297,342, filed September 30, 1939, and Patent 2,366,361, granted Jan. 2, 1945, to Semon and Craig. This critical ratio for the selective solvents of this invention is much lower than for many of the previously known solvents, being between about 10 to 20, hence the ratio chosen for actual operation will ordinarily be from 20 to 30 or perhaps even higher.

The solvents of this invention may be employed in any of the vapor-liquid extraction processes at normal temperature and pressure, that is, room temperature and 1 atmosphere pressure, or temperatures and pressures either above or below normal may be employed. Best results are obtained by choosing a temperature and pressure such that the vapors of the materials to be separated are about 15 to 50% soluble in the solvent used. This condition is easily realized with the nitroparaffin solvents when employing a temperature of about room temperature and a pressure of about one atmosphere, hence these conditions are preferred.

A convenient apparatus for the preparation of butadiene of a high degree of purity is a conventional fractionating column containing bubble cap plates, or any equivalent construction. For continuous separation of 95% butadiene from a hydrocarbon mixture containing 50% butadiene and 50% butylenes and butane, a column containing about thirty plates above the feed and about thirty plates below the feed is ordinarily adequate. For an intermittent operation a somewhat shorter column, say of thirty or thirty-five plates, may be used. Such an apparatus will differ from those employed in ordinary fractional distillations only in that a constant flow of the desired solvent will replace the usual reflux of condensate to the head of the column. It will, of course, be provided with a suitable boiler for supplying vapors of enriched butadiene to the foot of the column, and with means for ultimately stripping the purified butadiene from the solvent. Any other convenient apparatus may also be employed, it being understood that the invention is not intended to be limited to any particular process or apparatus for the liquid-vapor extraction.

As a specific example of one embodiment of the invention a mixture of hydrocarbons containing 51% butadiene and the remainder butylenes and butane is dissolved in 1-nitropropane and the solution is placed in the kettle of an intermittent still having thirty bubble cap plates. Slow distillation of the butadiene is started and 1-nitropropane is supplied at the top of the column in quantities thirty times the weight of the impurities removed. The initial fractions contain only about 2% of butadiene while the final fraction amounting to about 50% of the batch contains about 90% butadiene. By modifying the distillation so that the process is carried out continuously butadiene of over 95% purity is easily obtained. Similar results may be obtained with 1-nitrobutane, 2-nitrobutane, nitroethane or any other of the class of materials set forth above.

In another embodiment of the invention designed to determine the extent of enrichment obtained by a single extraction of impure butadiene with 1-nitrobutane a mixture of vapors of butadiene, butylenes and butane containing about 48% of butadiene is passed at 20° C. into 100 parts of 1-nitrobutane until equilibrium is established. Under these conditions about 18 parts by weight of the gases are dissolved in the solvent. Stripping of the solvent and analysis of the extracted gases reveals that the single extraction produces a mixture which contains 75% by weight of butadiene. This value is to be compared with enrichments to about 55–65% butadiene obtained with single extractions of the same mixture with solvents previously known to be selective for butadiene and shows the high degree of selectivity for butadiene exhibited by the solvents of this invention.

It is to be understood that many variations in the methods of operation and in the particular conditions of the extraction may be made without departing from the spirit and scope of the invention as defined in the appended claims.

I claim:

1. A process for separating and recovering butadiene from a mixture of four-carbon hydrocarbons having substantially the same boiling points and including butadiene, butylenes and butanes, which comprises bringing the said mixture of hydrocarbons in the gaseous state into contact with a liquid nitroparaffin of the formula R—NO$_2$ wherein R is an alkyl group containing less than six carbon atoms, and recovering enriched butadiene from the nitroparaffin.

2. A process for separating and recovering substantially pure butadiene from a mixture of four-carbon hydrocarbons having substantially the same boiling points and including butadiene, butylenes and butanes, which comprises distilling the said mixture through an efficient fractionating column down which flows a stream of a liquid nitroparaffin of the formula R—NO$_2$ wherein R is an alkyl group containing less than six carbon atoms, and recovering substantially pure butadiene from the nitroparaffin.

3. A process for separating and recovering butadiene from a mixture of four-carbon hydrocarbons having substantially the same boiling points and including butadiene, butylenes and butanes, which comprises bringing the said mixture of hydrocarbons in the gaseous state into contact with a liquid nitrobutane and recovering enriched butadiene from the nitrobutane.

4. A process for separating and recovering substantially pure butadiene from a mixture of four-carbon hydrocarbons having substantially the same boiling points and including butadiene, butylenes and butanes, which comprises distilling the said mixture through an efficient fractionating column down which flows a stream of a liquid nitropropane and recovering substantially pure butadiene from the nitropropane.

DAVID CRAIG.

(Other references on following page)

REFERENCES CITED

The following references are of record in the file of this patent:

UNITED STATES PATENTS

| Number | Name | Date |
|---|---|---|
| 1,882,978 | Schmidt et al. | Oct. 18, 1932 |
| 1,948,777 | Young et al. | Feb. 27, 1934 |
| 2,091,078 | McKittrick et al. | Aug. 24, 1937 |
| 2,190,025 | Hull | Feb. 13, 1940 |
| 1,988,032 | Baumann et al. | Jan. 15, 1935 |
| 2,085,546 | Roelfsema | June 29, 1937 |
| 2,205,996 | Van Wijk | June 25, 1940 |
| 2,290,636 | Deanesly | July 21, 1942 |
| 2,379,696 | Evans | July 3, 1945 |
| 2,366,360 | Semon | Jan. 2, 1945 |

FOREIGN PATENTS

| Number | Country | Date |
|---|---|---|
| 441,105 | British | July 12, 1934 |
| 441,104 | British | Jan. 13, 1936 |
| 548,733 | British | Oct. 22, 1942 |